US011279588B2

(12) United States Patent
Dubouis et al.

(10) Patent No.: US 11,279,588 B2
(45) Date of Patent: Mar. 22, 2022

(54) STACKING OF PLIES OF RUBBER COMPOUND

(71) Applicant: COMPAGNIE GENERALE DES ETABLISSEMENTS MICHELIN, Clermont-Ferrand (FR)

(72) Inventors: Sebastien Dubouis, Clermont-Ferrand (FR); Romain Saccomano, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 168 days.

(21) Appl. No.: 16/603,282

(22) PCT Filed: Apr. 5, 2018

(86) PCT No.: PCT/EP2018/058682
§ 371 (c)(1),
(2) Date: Oct. 7, 2019

(87) PCT Pub. No.: WO2018/185202
PCT Pub. Date: Oct. 11, 2018

(65) Prior Publication Data
US 2021/0107760 A1 Apr. 15, 2021

(30) Foreign Application Priority Data
Apr. 7, 2017 (FR) ........................ 1753026

(51) Int. Cl.
*B65H 31/32* (2006.01)
*B65H 45/107* (2006.01)

(52) U.S. Cl.
CPC ... *B65H 45/107* (2013.01); *B65H 2301/4216* (2013.01); *B65H 2701/11231* (2013.01); *B65H 2801/93* (2013.01)

(58) Field of Classification Search
CPC ............... B65H 45/107; B65H 45/101; B65H 2301/4216; B65H 2701/11231;
(Continued)

(56) References Cited

U.S. PATENT DOCUMENTS 2,218,062 A    10/1940 Yates
3,567,047 A *  3/1971 Clausen ................ B65H 29/36
                                                271/176
(Continued)

FOREIGN PATENT DOCUMENTS

DE    2534917 A1    2/1977
DE    3836974 A1    5/1990

OTHER PUBLICATIONS

International Search Report dated Apr. 24, 2018, in corresponding PCT/EP2018/058682 (3 pages).

*Primary Examiner* — Patrick H Mackey
(74) *Attorney, Agent, or Firm* — Venable LLP

(57) ABSTRACT

A method for stacking a ply (50) which is transferred from a rubber mixing system to a stacking system (100) comprises the steps of transferring the ply (50) to a stacking head (120) of the stacking system (100); passing the ply (50) to a motorized belt (110) of the stacking system (100), the motorized belt (110) being able to turn in both directions and being able to move in translation, and the motorized belt (110) being situated between the stacking head and a pallet (P) chosen from a pallet (P) with edges and a pallet (Q) without edges; and setting the motorized belt (110) into movement in translation so as to move along a path such that the motorized belt (110) receives the ply (50) from the stacking head (120) and makes a downstream end (50b) of the ply (50) to be stacked accessible in order to connect it to an upstream end (52a) of a ply (52) of a successive pallet and form a butt joint between the plies (50, 52).

10 Claims, 5 Drawing Sheets

(58) Field of Classification Search
CPC ....... B65H 31/32; B29B 7/566; B29B 7/7485; B29B 7/183; B29B 7/7495; B29B 7/7461
See application file for complete search history.

(56) References Cited

U.S. PATENT DOCUMENTS

| | | | | |
|---|---|---|---|---|
| 3,768,800 | A | | 10/1973 | Gutknecht |
| 4,452,442 | A | * | 6/1984 | Geschwindner ..... B65H 29/683 271/182 |
| 4,499,707 | A | | 2/1985 | Desjobert et al. |
| 4,712,787 | A | * | 12/1987 | Princiotta, Sr ......... B65H 29/36 271/176 |
| 4,778,165 | A | * | 10/1988 | Buck ..................... B65H 31/10 270/39.02 |
| 5,046,709 | A | * | 9/1991 | Beal ..................... B65H 45/103 270/30.05 |
| 6,042,108 | A | * | 3/2000 | Morgan ................ B65H 29/50 271/200 |
| 6,155,551 | A | | 12/2000 | Russ et al. |
| 7,469,888 | B2 | * | 12/2008 | Clevers ................. B65H 29/36 271/189 |
| 2001/0025869 | A1 | * | 10/2001 | Sander ................ B65H 45/101 226/108 |

* cited by examiner

STACKING OF PLIES OF RUBBER COMPOUND

TECHNICAL FIELD

The described invention relates generally to the successive production of rubber compounds in plies. More particularly, the described invention relates to the formation of plies of rubber compound which are stacked in a pallet or in successive pallets.

CONTEXT

Large quantities of individual rubber compounds need to be prepared for the series production of tyres, these individual compounds being prepared in batches. The production of a rubber for a vehicle tyre comprises multiple successive mixing steps. For example, FIG. 1 shows a mixing system 10 intended for manufacturing one or more rubber products to be incorporated into one or more vehicle tyres. The system 10 comprises a mixing installation 20 which carries out a mixing process. The mixing installation 20 comprises at least one internal mixer 22 having a chamber 24 with a predefined filling volume. The internal mixer 22 receives an elastomer material 27 (for example a natural rubber, a synthetic elastomer and combinations and equivalents thereof) and one or more ingredients, with the exception of the vulcanization system. The internal mixer 22 mixes the elastomer material and ingredients in order to obtain a rubber compound 29 therefrom.

The rubber compound 29 is transported to a mixing and cooling installation 30 which comprises at least one external mixer having a pair of rollers 32. Following the mixing process realized at the mixing installation 20, the system 10 passes the rubber compound 29 between the rollers 32 in order to form a continuous ply 33.

During a process for forming the ply 33, one or both rollers 32 may have a means for cooling by fluid or the like, as is known in the art. This cooling means may be combined with other cooling equipment, for example at least one spraying installation 40 for controlling a temperature and an addition of water into the rubber compound produced.

At the end of a subsequent process (commonly referred to as "batch off"), the plies are then deposited in a reciprocating manner (to form a stack, or be "stacked") on a pallet both for transport and for storage before being used in the production of finished products. Although multiple pallets of plies are filled in processes for producing tyres, an optimized setup of equipment exists which makes it possible to butt the plies together in a pallet and in successive pallets.

SUMMARY

The invention proposes a method for stacking a ply which is transferred from a rubber mixing system to a stacking system. The method comprises the step of transferring the ply to a stacking head of the stacking system. The ply is passed to a motorized belt of the stacking system, the motorized belt being able to turn in both directions and being able to move in translation, and the motorized belt being situated between the stacking head and a pallet chosen from a pallet with edges and a pallet without edges. The motorized belt is set into movement in translation so as to move along a path such that the motorized belt receives the ply from the stacking head and makes a downstream end of the ply to be stacked accessible in order to connect it to an upstream end of a ply of a successive pallet and form a butt joint between the plies.

Some methods also include the steps of turning the motorized belt in a first direction; placing the motorized belt in a position to receive the ply from the stacking head at the same time as the stacking head continues to pass the ply to the motorized belt; and stopping the motorized belt from turning at the same time as the stacking head continues to pass the ply.

For some embodiments of the invention, the stacking head has two alternating motorized belts, and each one turns in a predetermined direction at the same time as each one pivots about its axis of rotation along a preset contour. For some embodiments of the invention, the alternating motorized belts maintain a spacing between one another in order to pass the ply to the motorized belt.

For some embodiments of the invention, the method also comprises the step of pivoting the alternating motorized belts along the preset contour in order to stack the ply in the pallet.

Some methods also include the steps of ending stacking when a predetermined quantity of material has been reached in the pallet; turning the motorized belt in an opposite direction; and moving the motorized belt so that it is positioned above the pallet. For some embodiments of the invention, the step of ending stacking also comprises the step of taking an upstream end of the ply as far as the top of the pallet.

Some methods also include the step of repeating the stacking for at least one successive pallet chosen from a pallet with edges and a pallet without edges. For some embodiments of the invention, the method also comprises the step of creating a junction between a downstream end of the ply and an upstream end of the ply palletized in the successive pallet.

For some embodiments of the invention, the stacking system receives and stacks the material of the ply to a predetermined height or weight of the material.

For some embodiments of the invention, the method also comprises the step of choosing a pallet without edges which is capable of descending as a function of a quantity of material received during the stacking of the ply. For some embodiments, a vertical clearance between the alternating motorized belts and the last fold of the ply remains constant.

The invention also proposes a stacking system which carries out the stacking methods according to the invention.

Further aspects of the described invention will become clearly apparent from reading the following detailed description.

BRIEF DESCRIPTION OF THE DRAWINGS

The nature and the various advantages of the described invention will become clearer from reading the following detailed description, considered in conjunction with the appended drawings, in all of which similar reference signs denote comparable parts, and in which.

DETAILED DESCRIPTION

Figure 1:
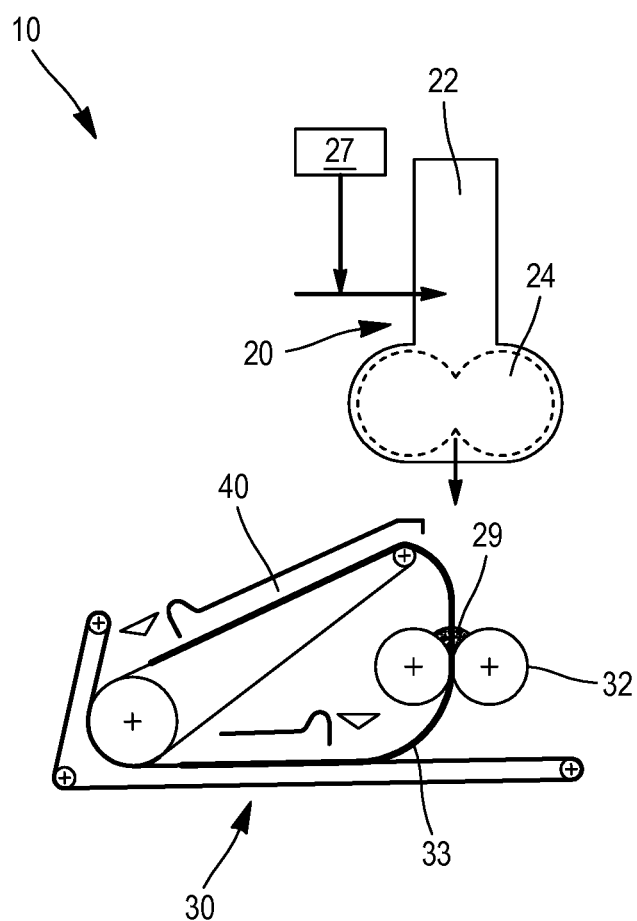
FIG. 1 shows a diagram of an example of a mixing system intended for the production of rubber according to a method for producing rubber.

Referring again to the figures, in which the same numerals identify identical elements, FIGS. 2 to 15 show embodiments of a method for stacking a ply 50 leaving a rubber mixing system which produces it. A stacking method is carried out by a stacking system 100 which receives the ply 50 from the rubber mixing system. The stacking system 100 can operate with a rubber mixing system such as the system 10 shown in FIG. 1. It will be understood that the stacking system 100 can also operate with other equivalent rubber mixing systems, including additional and complementary systems and installations which carry out other rubber mixing methods. The stacking system 100 can operate with rubber mixing systems which realize single-pass production sequences (i.e. production sequences which are carried out only once before the stacking method) and also with rubber mixing systems which realize multi-pass production sequences (i.e. production sequences which are carried out two or more times before the stacking method). One or more known conveyor belts (or equivalent transport means) transfer(s) the ply 50 from the chosen rubber mixing system to the stacking system 100.

The stacking system 100 comprises a material handling device for stacking the ply 50 leaving a rubber mixing system. The handling device has a motorized belt 100 that is able to turn in both directions and a stacking head 120. The motorized belt 110 is able to move in translation and is situated between a pallet and the stacking head 120. The pallet is chosen from a pallet P with edges (see FIGS. 2 to 7) and a pallet Q without edges (see FIGS. 9 to 15).

Figure 8:
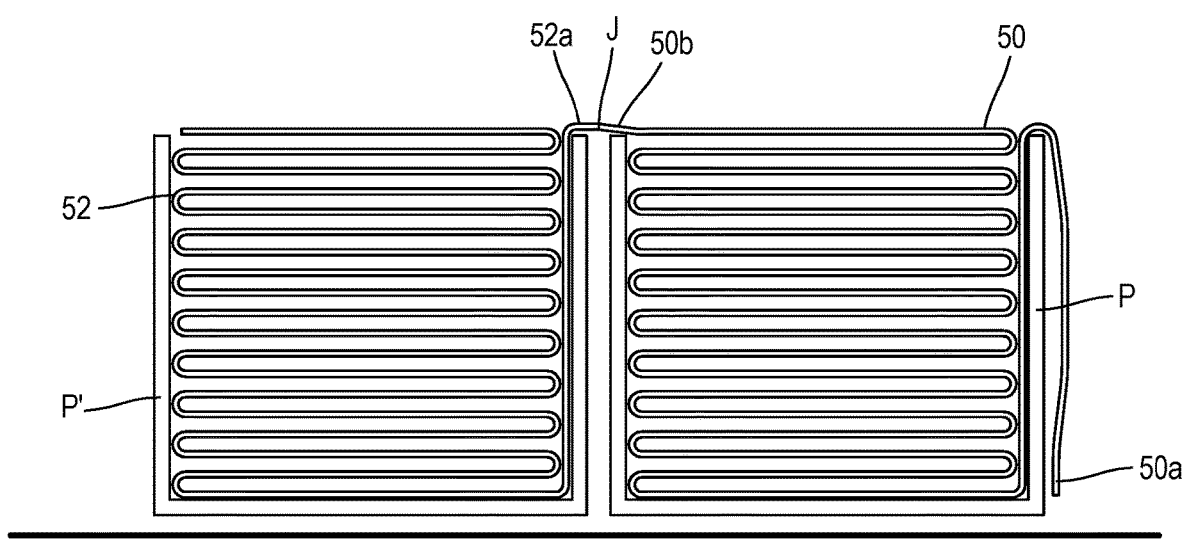
FIG. 8 shows a schematic view of the butting together of the plies stacked by the system in FIGS. 2 to 7.
Figure 9:
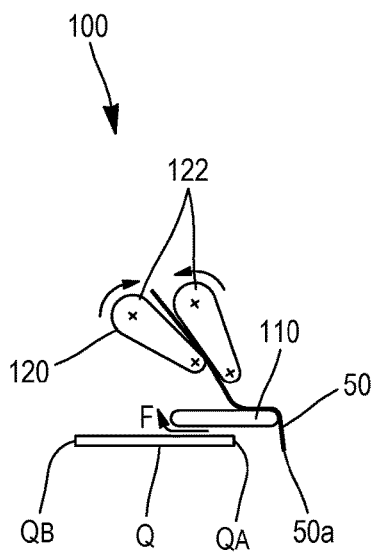
FIGS. 9 to 14 show stacking steps carried out by a stacking system according to another embodiment of the invention.

The motorized belt can be set into movement in translation so as to move along a path such that the motorized belt 110 receives the ply 50 from the stacking head 120 and makes a downstream end 50b of the ply 50 to be stacked accessible in order to connect it to an upstream end 52a of a ply 52 of a successive pallet P' (see FIG. 8). The motorized belt 110 takes up a standby position along the path defined while waiting for the pallet P (see FIGS. 3 to 6) or the pallet Q (see FIGS. 10 to 13) to be filled.

The stacking head 120 has two alternating motorized belts 122, and each one pivots about its axis of rotation along a preset contour. Each alternating motorized belt 122 can turn in a predetermined direction (for example, see the directions indicated by the arrows A, A' in FIGS. 2 to 7). While the stacking head 120 is operating, the alternating motorized belts 122 maintain a spacing 125 between one another (see FIGS. 6 and 7). The ply 50 is produced with a desired thickness and width, and the spacing 125 can be adjusted in order to pass the ply 50 to the motorized belt 110. The motorized belt 110 and the stacking head 120 can be selected from devices that are commercially available.

Figure 2:
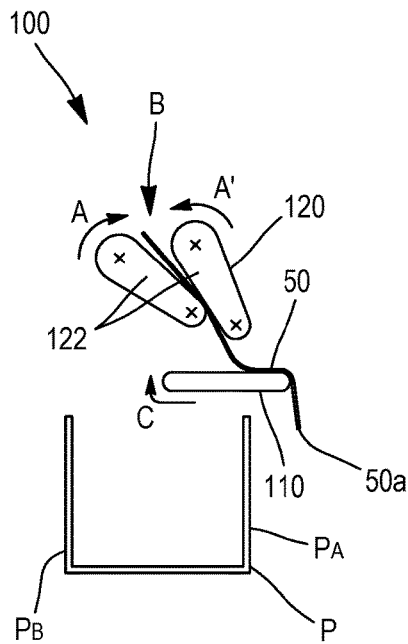
FIGS. 2 to 7 show stacking steps carried out by a stacking system according to one embodiment of the invention.

Referring again to the figures and to FIG. 2, at the start of stacking, the rubber mixing system transfers the ply 50 to the stacking system 100 and particularly to the stacking head 120 (see the arrow B in FIG. 2). The stacking head 120 receives the ply 50 and, with the alternating motorized belts 122, passes the ply to the motorized belt 110 waiting beneath the stacking head 20. The motorized belt 110 turns in a first direction (see the arrow C) in order to lower an upstream end 50a of the ply 50 on a side $P_A$ outside the pallet P.

Figure 3:
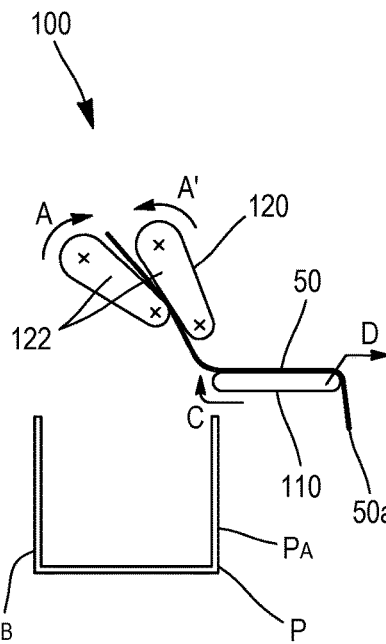

Referring to FIG. 3, when the upstream end 50a of the ply 50 is clear of the pallet P, the motorized belt 110 moves back until it is outside the pallet P from the edge $P_A$ (see the arrow D), while continuing to turn in the same direction (see the arrow C). At the same time, the stacking head 120 continues to pass the ply 50 to the motorized belt 110.

Figure 4:
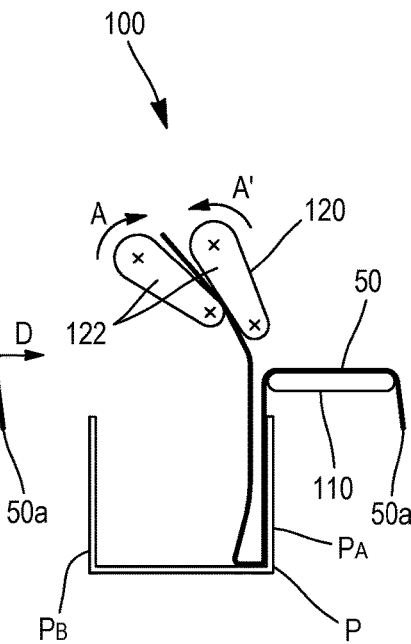

Referring to FIG. 4, once the motorized belt 110 has moved clear of the pallet P, the motorized belt takes up the standby position and stops turning. The stacking head 120 continues to pass the ply 50, which descends down to the bottom of the pallet P.

Figure 5:
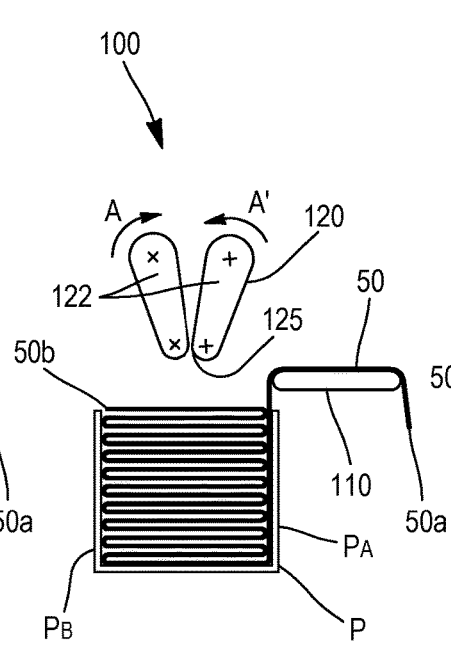

Referring to FIG. 5, when the ply 50 reaches the bottom of the pallet P, the alternating motorized belts 122 pivot along the preset contour in order to stack the ply 50 in the pallet P. The stacking head 120 continues to pass the ply 50 in order to start stacking in a "reciprocating" manner from the edge $P_A$ of the pallet P to an opposite edge $P_B$ (i.e., the successive formation of folds and loops). In this embodiment, the palletized material is stacked higher in the pallet P, and the alternating motorized belts 122 remain vertically stationary. It is not necessary to raise the stacking head 120 with respect to the stacking height of the ply. The movement in translation effected by the motorized belt 110, and the vertical clearance of the motorized belt 110 with respect to the alternating motorized belts 122, together ensure regular stacking with the regular formation of each loop.

Figure 6:
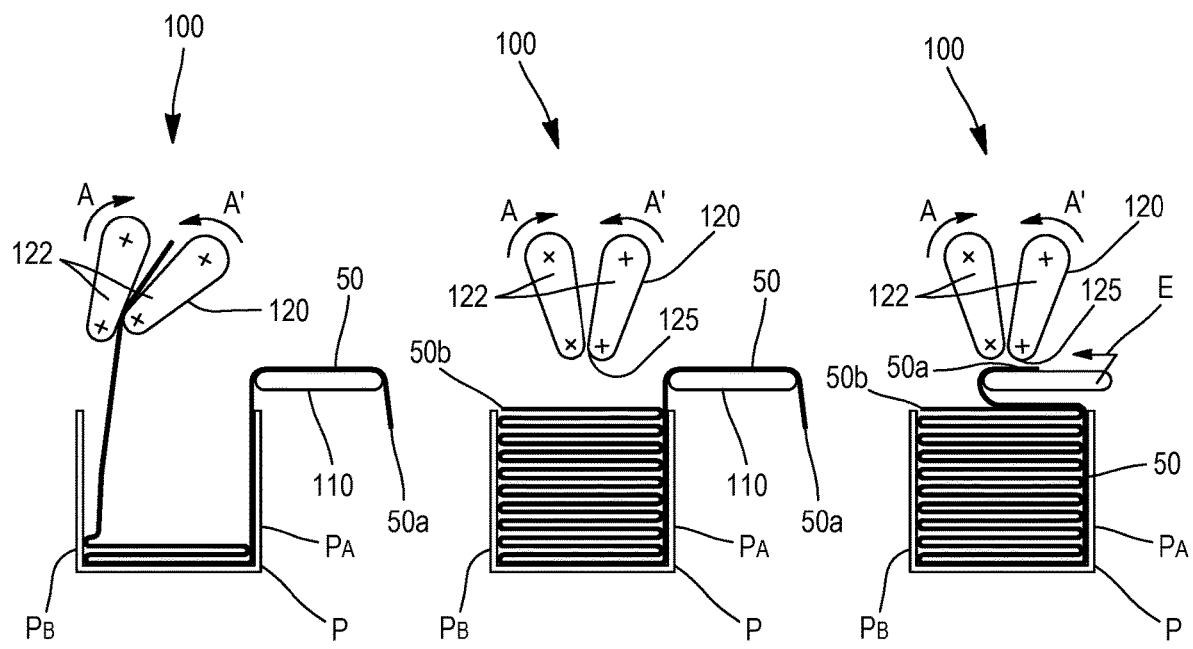

In a final step of the stacking method, stacking ends when a predetermined quantity of material has been reached. Referring to FIG. 6, this stacking is ended by the ply 50 being cut when the pallet P is full. The alternating motorized belts 122 pivot into a neutral position while waiting for a next ply.

Figure 7:
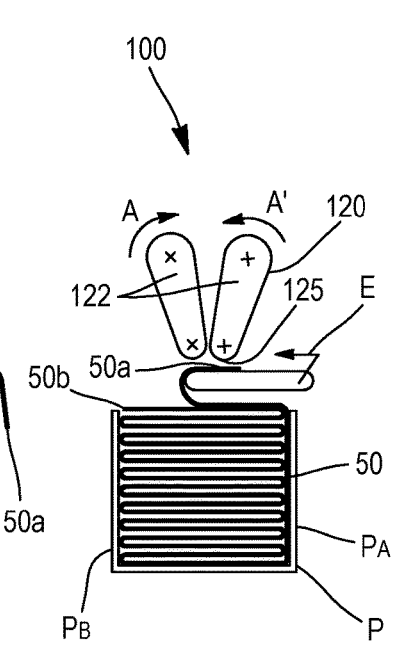

Referring to FIG. 7, when the pallet P is full, the motorized belt 110 turns in an opposite direction (see arrow E) with respect to the start of the method. At the same time, the motorized belt 110 moves from the standby position in order to be positioned above the pallet P. Thus, at the end of the stacking method, the motorized belt deposits the upstream end 50a of the ply 50 on the top of the pallet P. In another embodiment, the motorized belt 110 turns in an opposite direction (see the arrow E) but remains in the standby position. In this embodiment, the upstream end 50a of the ply 50 will be deposited along the edge $P_A$ outside the pallet P.

In order to butt the plies 50 and 52 together, stacking can be repeated, as described with respect to FIGS. 2 to 7, in a successive pallet P'. Referring to FIG. 8, in some embodiments, the stacking method comprises an optional step of creating a junction J between a downstream end 50b of the ply 50 and the upstream end 52a of the ply 52 palletized in a successive pallet P'. The plies 50 and 52 are thus butted together.

Referring also to FIGS. 9 to 14, another embodiment of a stacking method is realized with a pallet Q without edges. The pallet Q is capable of descending as a function of a quantity of material received during the stacking of the ply 50. At the start of stacking, the rubber mixing system transfers the ply 50 to the stacking system 100 and particularly to the stacking head 120 (see FIG. 9). The stacking head 120 receives the ply 50 and, with the alternating motorized belts 122, passes the ply to the motorized belt 110 waiting to receive the ply 50. The motorized belt 110 turns in a first direction (see the arrow F) in order to lower a front end 50a of the ply 50 outside the pallet Q. While the stacking head 120 is operating, the alternating motorized belts 122 maintain a spacing 125 between one another (see FIG. 13) which may be adjusted in order to pass the ply 50 to the motorized belt 110.

Figure 10:
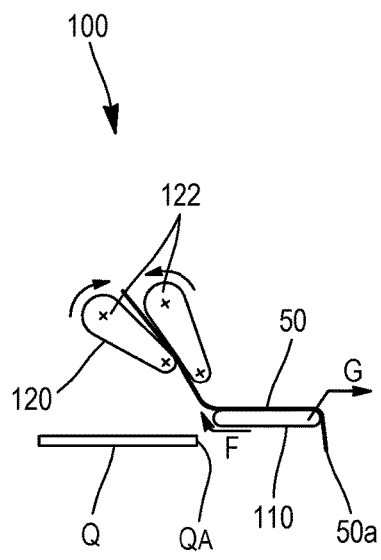

Referring to FIG. 10, when the upstream end 50a of the ply 50 is clear of the pallet Q, the motorized belt 110 moves back until it is outside the pallet Q (see the arrow G), while continuing to turn in the same direction (see the arrow F). At the same time, the stacking head 120 continues to pass the ply 50 to the motorized belt 110.

Figure 11:
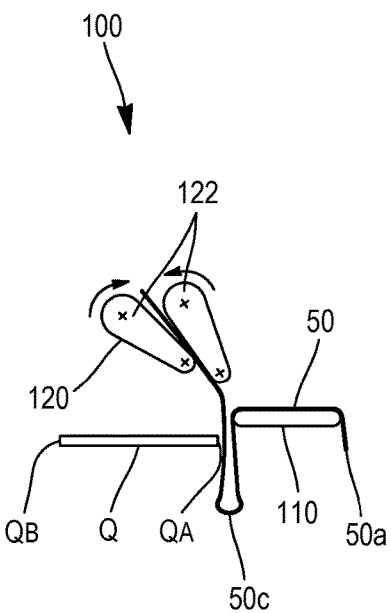

Referring to FIG. 11, once the motorized belt 110 has moved clear of the pallet Q, the motorized belt takes up the standby position and stops turning. The stacking head 120 continues to pass the ply 50 which lowers a predetermined length 50c of the ply 50 between the motorized belt 110 and the side $Q_A$ of the pallet Q which is closest to the motorized belt.

Figure 12:
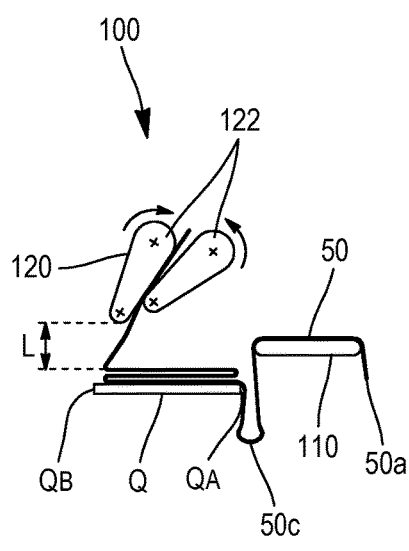

Referring to FIG. 12, the alternating motorized belts 122 pivot along the preset contour towards the opposite side $Q_B$ of the pallet Q. The stacking head 120 continues to pass the ply 50 in order to start stacking in a "reciprocating" manner from the side $Q_A$ of the pallet Q to the opposite side $Q_B$. At the same time as the palletized material is stacked on the pallet Q, the pallet Q descends with respect to the stacking head 120 (see also FIG. 13). A vertical clearance L between the alternating motorized belts 122 and the last fold of the ply 50 remains constant in order to ensure regular stacking with the regular formation of each loop.

Figure 13:
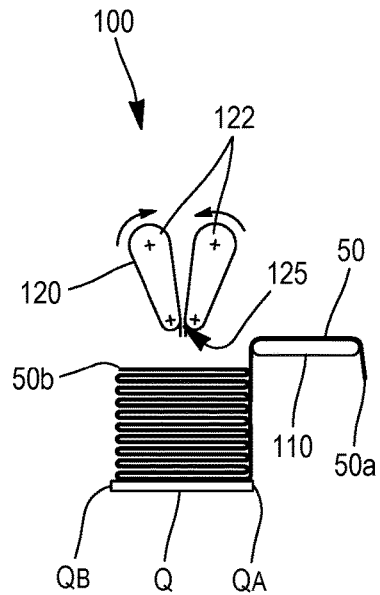

In a final step of the stacking method, stacking ends when a predetermined quantity of material has been reached. Referring to FIG. 13, this stacking is ended by the ply 50 being cut when the pallet Q is full. The alternating motorized belts 122 pivot into a neutral position while waiting for a next ply.

Figure 14:
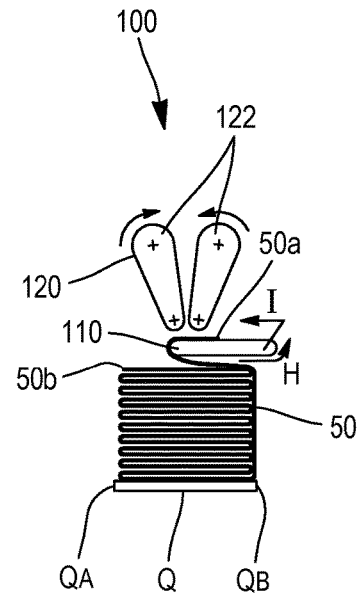

Referring to FIG. 14, when the pallet Q is full, the motorized belt 110 turns in an opposite direction (see arrow H) with respect to the start of the method. At the same time, the motorized belt 110 moves so as to be positioned above the pallet Q (see the arrow I). Thus, at the end of the stacking method, the motorized belt deposits the front end 50a of the ply 50 on the top of the pallet Q. The predetermined length 50c of the ply 50 which has been lowered between the motorized belt 110 and the side $Q_A$ of the pallet Q is sufficient for the upstream end 50a of the ply 50 to be deposited on the top of the palletized material.

Figure 15:
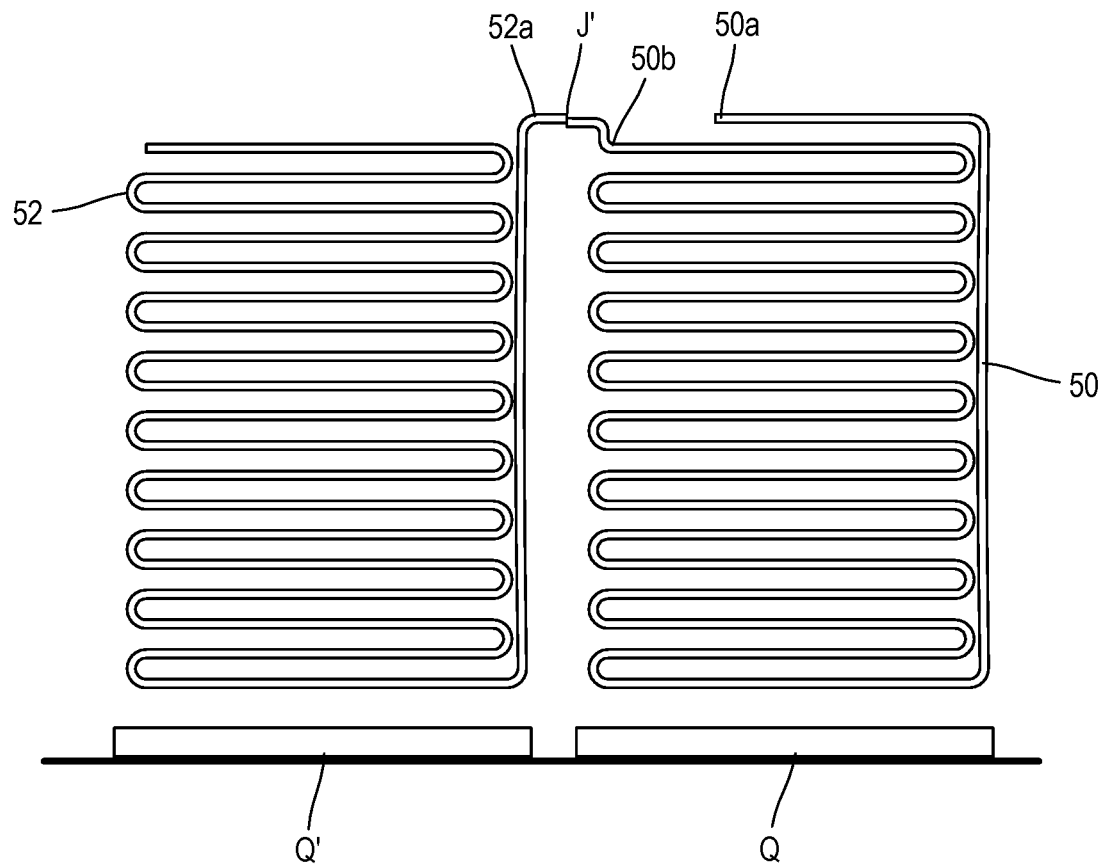
FIG. 15 shows a schematic view of the butting together of the plies stacked by the system in FIGS. 9 to 14.

In order to butt the plies 50 and 52 together, stacking can be repeated, as described with respect to FIGS. 9 to 14, on a successive pallet Q'. Referring to FIG. 15, in some embodiments, the stacking method comprises an optional step of creating a junction J' between a downstream end 50b of the ply 50 and an upstream end 52a of the ply 52 palletized in a successive pallet Q' (see FIG. 15). The plies 50 and 52 are thus butted together.

The butt joint thus obtained makes it possible to use a long length of ply (several pallets) in a downstream method with it being necessary for an operator to intervene. Increases in productivity are thus realized.

For the two embodiments, it will be understood that the stacking system 100 is capable of receiving and stacking the material of a ply up to a predetermined height or weight. Consequently, the stacking system 100 can also have an automated detection system which includes at least one sensor for the increasing height of the loops. The detection system serves for detection and to generate one or more signals indicating the height. The detection system may comprise a means for detecting the weight of the material and of the pallet, wherein the signals are emitted when a predetermined weight is reached.

The stacking system 100 may also include a monitoring system which is configured to receive the signals detected (for example the height or weight signals) and to emit one or more proportional control signals. Monitoring may be continuous or intermittent, such that the control signals effect an adjustment in real time of the material stacking parameters (for example by modifying the rate at which the stacking head 120 stacks the ply 50 in the pallet P or the pallet Q). The monitoring system may be programmed to stop the stacking of the ply when a fault is detected in the stacking system 100. It is thus easy to check proper operation of the stacking system 100 and to make adjustments if necessary.

The monitoring system may include at least one programmable controller communicating with the stacking system 100. The programmable controller may have, programmed within it, data established for a plurality of plies of rubber compound that each have different stacking method parameters. With the aid of these data, the monitoring system may be configured to receive the signals detected and make a corresponding adjustment. All or part of the monitoring system may be remote-controlled by way of a network.

The ranges given as lying "between a and b" encompass the values of "a" and "b".

Although particular embodiments of the disclosed device have been illustrated and described, it will be appreciated that various changes, additions and modifications can be made without departing from either the spirit or scope of the present description. Therefore, no limitation should be imposed on the scope of the invention described, except for the limitations set out in the appended claims.

The invention claimed is:

1. A method for stacking a ply which is transferred from a rubber mixing system to a stacking system, the method comprising the steps:
   transferring the ply to a stacking head of the stacking system;
   passing the ply to a motorized belt of the stacking system, the motorized belt being able to turn in both directions and being able to move in translation, and the motorized belt being situated between the stacking head and a pallet; and
   setting the motorized belt into movement in translation by turning the motorized belt in a first direction so as to move along a path such that the motorized belt is placed in a position to receive the ply from the stacking head at the same time as the stacking head continues to pass the ply to the motorized belt, and stopping the motorized belt from turning at the same time as the stacking head continues to pass the ply, making a downstream end of the ply to be stacked accessible in order to connect it to an upstream end of a ply of a successive pallet and form a butt joint between the plies,
   wherein the stacking head has two alternating motorized belts, and each one turns in a predetermined direction at the same time as each one pivots about its axis of rotation along a preset contour.

2. The method of stacking according to claim 1, wherein the alternating motorized belts maintain a spacing between one another in order to pass the ply to the motorized belt.

3. The method of stacking according to claim 1 further comprising the step:
   pivoting the alternating motorized belts along the preset contour in order to stack the ply in the pallet.

4. The method of stacking according to claim 1 further comprising the steps:

ending stacking when a predetermined quantity of material has been reached in the pallet;
turning the motorized belt in an opposite direction; and
moving the motorized belt so that it is positioned above the pallet.

5. The method of stacking according to claim 4, wherein the step of ending stacking also comprises the step of taking an upstream end of the ply as far as the top of the pallet.

6. The method of stacking according to claim 1 further comprising the step:
repeating the stacking for at least one successive pallet.

7. The method of stacking according to claim 6 further comprising the step:
creating a junction between a downstream end of the ply and an upstream end of the ply palletized in the successive pallet.

8. The method of stacking method according to claim 1, wherein the stacking system receives and stacks the material of the ply to a predetermined height or weight of the material.

9. The method of stacking according to claim 1 further comprising the step:
choosing a pallet without edges which is capable of descending as a function of a quantity of material received during the stacking of the ply.

10. The method of stacking according to claim 1, wherein a vertical clearance between the alternating motorized belts and the last fold of the ply remains constant.

* * * * *